Dec. 20, 1966  J. G. FONTAINE  3,293,529
MULTIPLE AUTOMATIC BATTERY TESTER AND CHARGER
Filed Dec. 23, 1963  4 Sheets-Sheet 1
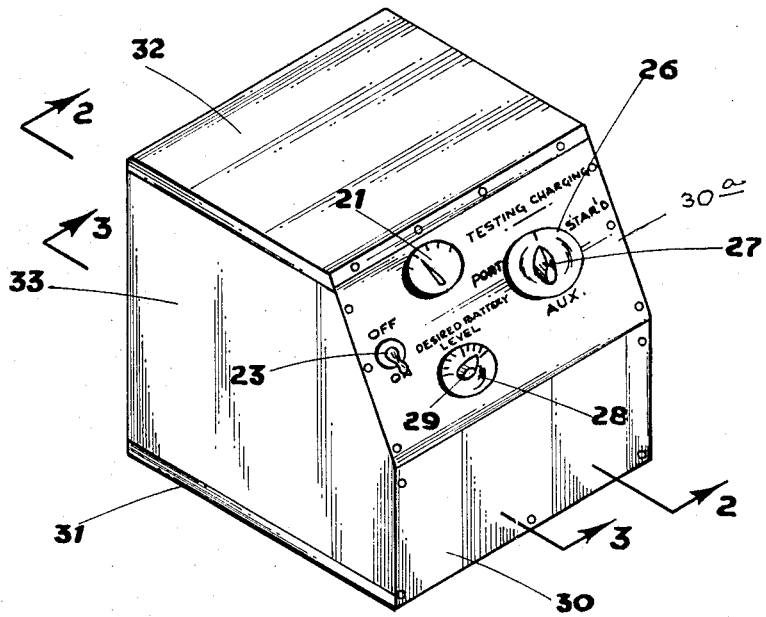
FIG. 1
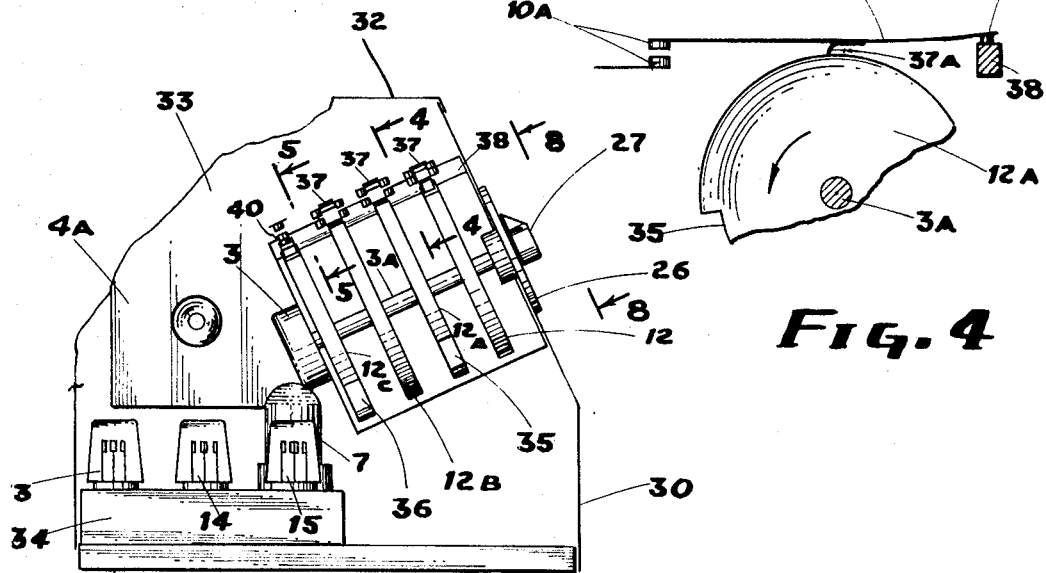
FIG. 2
FIG. 4
INVENTOR.
JOHN G. FONTAINE
BY
ATTORNEY Dec. 20, 1966   J. G. FONTAINE   3,293,529
MULTIPLE AUTOMATIC BATTERY TESTER AND CHARGER
Filed Dec. 23, 1963   4 Sheets-Sheet 2
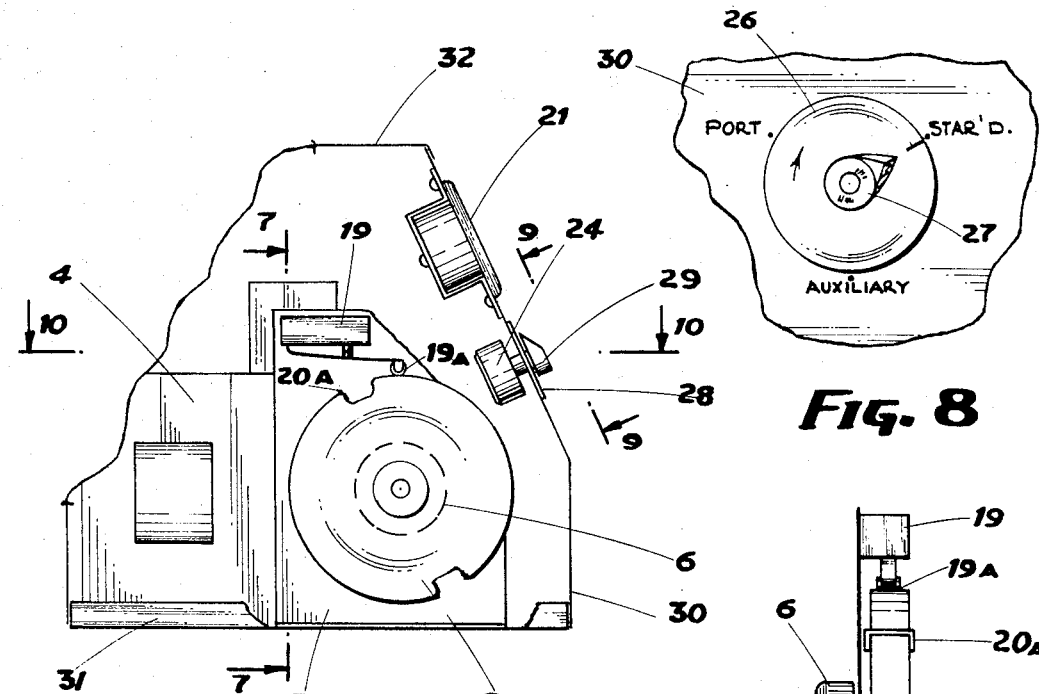
FIG. 3
FIG. 8
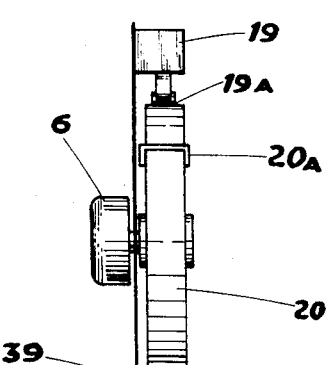
FIG. 7
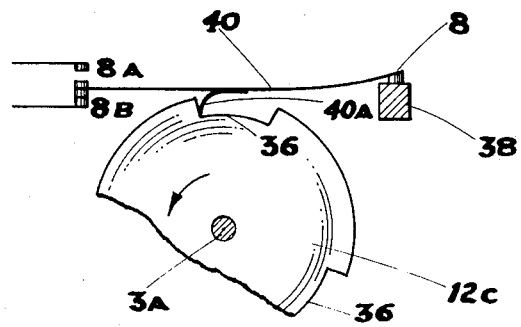
FIG. 5
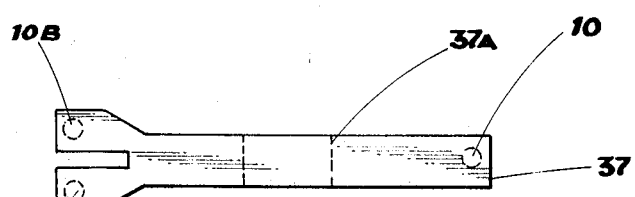
FIG. 6
INVENTOR.
JOHN G. FONTAINE
BY
ATTORNEY Dec. 20, 1966  J. G. FONTAINE  3,293,529
MULTIPLE AUTOMATIC BATTERY TESTER AND CHARGER
Filed Dec. 23, 1963  4 Sheets-Sheet 3

INVENTOR.
JOHN G. FONTAINE
BY
ATTORNEY

3,293,529
MULTIPLE AUTOMATIC BATTERY
TESTER AND CHARGER
John G. Fontaine, 2817 NE. 26th Court,
Fort Lauderdale, Fla. 33306
Filed Dec. 23, 1963, Ser. No. 332,559
8 Claims. (Cl. 320—15)

This invention relates to an apparatus for automatically testing banks or groups of batteries, or for testing individual batteries at frequent intervals to ascertain their charge level. If a low charge level is detected by the apparatus in the bank of batteries, the apparatus will automatically start a charging cycle to bring the charge in the batteries up to a required level.

The invention is particularly applicable for use in boats or yachts where the problem of keeping the batteries charged is of major importance. In many cases boats are left unattended for long periods of time and some battery chargers presently in use are either continuously charging at a high or low level, both of which has a damaging effect upon battery cells when overcharging takes place. Other battery chargers presently in use require starting and stopping, both of which can be forgotten.

It is therefore an object of the present invention to provide an automatic, trouble-free device which needs no maintenance; which does not have to be switched on or off; which tests and charges the batteries regardless of whether the boat is at sea or is located at a dock, which has a safety feature, at sea would immediately detect the low battery level due to, for example a generator failure, it would then charge up the batteries and would thus bring the boat safely to port.

It is another object of the invention to provide a device of this kind which will, by its use and operation, tend to materially extend the life of the batteries since the batteries will be kept at a steady level of charge at all times. Various known devices attempting to maintain a charge level, employ a trickle-charging means and which, after a prolonged period of use tend to have a damaging effect on the batteries.

The construction to be described, while primarily developed for marine application, can be used wherever batteries are required to be kept on a constantly high charge level.

It is an object of the invention to provide a fully automatic battery-testing and charging device which will periodically and accurately test a single battery or a group of batteries independently of each other to determine the respective level of charge.

It is another object of the invention to provide a device of this kind having a circuit which, if the level of one bank of batteries is found to be below a certain desired level, will show the existing level on the unit, and the circuit will be operative to interrupt its testing cycle and will start a charging cycle which will direct current only to the particular bank of batteries found to be below the desired level and as was indicated by the indicating means on the unit.

It is another object of the invention to provide means by which the length of required charging time for any particular bank of batteries is determined, and which is done by the stoppage of the unit after the expiration of a predetermined charging time and re-testing the level of the battery. If in the period of changing time above mentioned, the battery charge has reached the desired level, the testing circuit will then by-pass the battery bank that has just been charged and will direct its attention to another bank of batteries.

It is another object of the invention to provide means in a unit of this kind which will enable the operator to visually observe on the face of the unit, the particular bank of batteries being tested or being charged.

One other object of the invention is to provide means for directing the charging current to any particular bank of batteries without waiting for the cycling time, by the manual manipulation of a dial located at the face of the unit.

It is an object of the invention to provide a device which will by its use, tend to extend battery life by keeping the batteries at a constant level of charge and preventing overcharge.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a perspective view of a battery-detecting and charging apparatus constructed according to the present invention;

FIG. 2 is a sectional view, taken substantially on the line 2—2 of FIG. 1, looking in the direction of the arrows;

FIG. 2 is a sectional view, taken substantially on the line 3—3 of FIG. 1, looking in the direction of the arrows;

FIG. 4 is a sectional view taken substantially on the line 4—4 of FIG. 2, looking in the direction of the arrows;

FIG. 5 is a sectional view, taken substantially on the line 5—5 of FIG. 2, looking in the direction of the arrows;

FIG. 6 is a view taken on the line 6—6 of FIG. 4, looking in the direction of the arrows;

FIG. 7 shows the charging time assembly;

FIG. 8 is a view taken substantially of the line 8—8 of FIG. 2, looking in the direction of the arrows;

Figure 9:
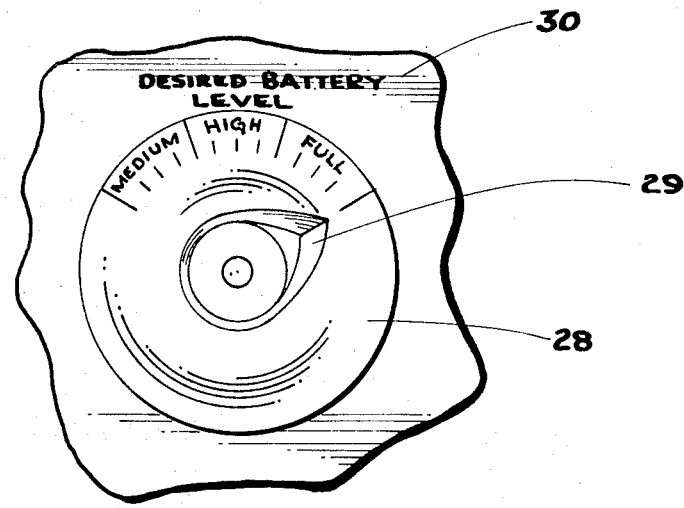
FIG. 9 is a view taken substantially on the line 9—9 of FIG. 3, looking in the direction of the arrows.

The present invention contemplates a device or apparatus which automatically tests banks of batteries, or individual batteries at predetermined time intervals for their charge level. For example, the described device is designed for use in connection with three banks of batteries although the number of banks to be used can be varied by small changes in the apparatus. The described apparatus can be used for two-bank application without requiring any changes in design by simply connecting the second bank terminals to the second and third bank connections in the apparatus.

In the drawings, the apparatus is shown as being contained in a housing which includes a bottom plate 31, a top plate or cover 32, side walls or plates 33 and a face plate 30. The face plate 30 includes a sloped or inclined upper panel 30A on which are mounted the instruments for the unit and which instruments include a switch 23, an ammeter 21; the charging level indicator 29 and the cycle indicator 26 and 27.

The cycle indicator consists of a rotative dial 26 rigidly connected to a knob 27 and which can be turned in a clockwise direction as viewed in FIG. 8. The cycle indicator is part of a selector assembly which extends perpendicularly from the inclined panel 30A. Said selector assembly includes a synchromotor 3, located on a main shaft 3A, and the selector disks indicated respectively at 12, 12A, 12B and 12C, the disks being mounted on the shaft 3A. The entire assembly as described above is secured to or mounted on the panel 30A by a frame which includes the bar shown at 38. The various selector disks 12, 12A, 12B and 12C are each provided with radial notches as shown. The selector disks 12, 12A and 12B are each provided with the peripheral notch indicated at 35 while the selector disk 12C is shown as being provided with three notches 36, the latter notches being equally spaced apart on the circumference of the disk 12C.

Perpendicular to the rotating disks are a number of switch arms 37 and 40. Mounted on each of the arms 37 and sliding on the peripheral surfaces of the rotating disks 12, 12A and 12B is a contact element 37A (FIG. 4). In the case of the disk 12C, the contact element carried by the arm 40 is indicated at 40A and is shown in FIG. 5.

Figure 11:
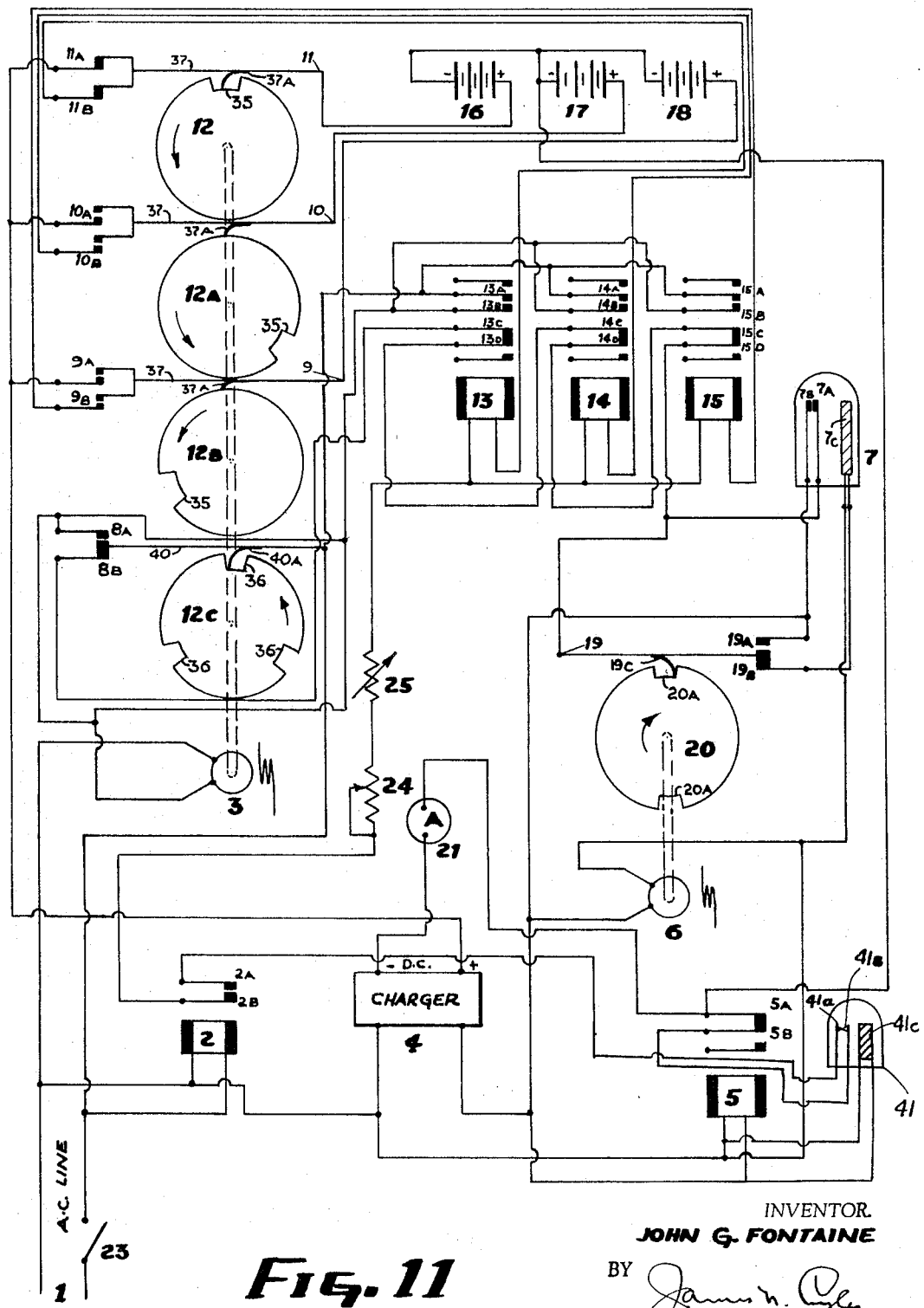
FIG. 11 shows the electrical circuit.

The switching arms 37, which are respectively operative against the disks 12, 12A and 12B, each carry breaker points shown at 11, 11A and 11B (FIG. 11) in the case of the disk 12. In the case of disk 12A the arm therefor carries breaker points 10, 10A and 10B; in the case of the arm 37 for the disk 12B the breaker points are shown at 9, 9A and 9B. The arm 40 for the disk 12C carries the breaker points shown at 8, 8A and 8B as shown in FIGS. 5 and 11. In FIG. 6 the switching arm 37 or 40 is shown as it appears from above.

Figure 10:
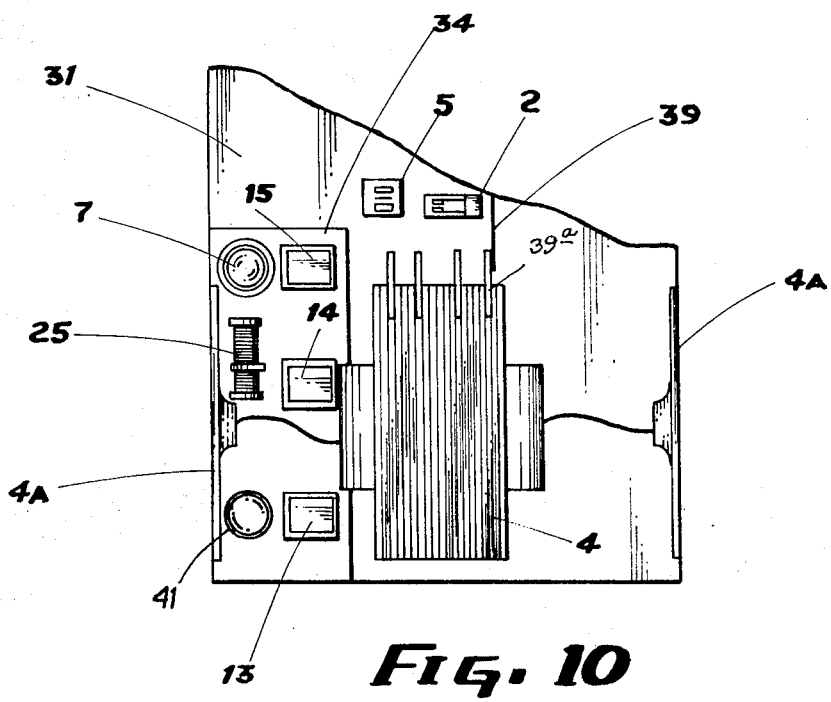
FIG. 10 is a sectional view, taken substantially on the line 10—10 of FIG. 3, looking in the direction of the arrows.

Mounted on the bottom plate 31 of the housing is a relay box 34 (FIG. 2) which carries relays indicated respectively at 13, 14 and 15 as well as two Amperites or similar thermal relays 7 and 41 respectively and a variable resistor 25. (FIGS. 10 and 11.) Also mounted on the bottom plate 31 are the relays shown at 2 and 5, seen in FIG. 10. A transformer is shown at 4 and rectifier plates at 4A, both of which are part of the charger and are mounted on the bottom plate 31 and side plates 33 of the housing.

The transformer 4 has cooling fins 39A to one of which a mounting plate 39 is attached and which is part of the charging time assembly. The charging time assembly consists of the synchromotor 6, the rotating disk 20 driven by the synchromotor, the contact elements 20A, the microswitch 19 and the contact 19A, all of which are shown in FIG. 3.

The rotating disk 20 is provided with two contact notches 20A in its periphery, said notches being diametrically opposite to one another. The contact notches in the rotative movement of the disk 20 engage with the roller 19A to thereby activate the microswitch as will be later explained.

Located in the lower portion of the inclined panel 30A and extending perpendicularly from it toward the inside of the housing is the battery level indicator which includes a knob 29, a plate 28 and a rheostat 24. Engraved on the plate 28, seen in FIG. 9, are the charging levels namely, "medium," "high" and "full."

Returing to the testing-charging indicator shown in FIG. 8, it will be there seen that the face of the panel around the dial 26, indicates three positions namely, "port," "starboard" and "auxiliary." The dial assembly, composed of the parts 26 and 27 can be turned to either of these positions by clockwise rotation only.

The unit operates completely automatically once the switch 23 is moved to "on" position and the desired battery level has been selected on the dial 28.

In the operation of the device when connected to an A.C. current source as indicated at the lower part of FIG. 11, the disks 12, 12A, 12B and 12C will all be turned simultaneously by their mounting on the shaft 3A which shaft is connected to and is driven by the synchromotor 3. The A.C. current source can be had from a power line when the boat is at a dock or the current can come from the boat generators when the boat is at sea. The synchromotor 3 makes one revolution in each thirty minutes and during that cycle it tests each of the battery banks 16, 17 and 18 once. It does this because of the points 9, 10 and 11 closing. In each ten minute period one of the notches 35 will be engaged by one or the other of the points 9, 10 or 11 permitting the point to drop and close on either 9A, 9B, 10A, 10B or 11A or 11B.

By following the circuit disclosed in FIG. 11 it will be noted that through the above action, the elements 11A and 11B are closed. In following the wire leading from 11B it will be seen that it is connected to the positive side of the coil shown at 13 which is a D.C. relay using the same voltage as that of the batteries shown at 16, 17 and 18. If there is sufficient voltage for example in the battery 16 to close the relay 13, the wiring circuit is such that the A.C. current will be redirected through the points 13A and 13B to cause the motor 3 to continue through a further cycle. If however, the points 13A and 13B do not close because of insufficient voltage from the battery, the motor 3 will continue to operate until the point 40A drops into the notch 36. Point 37 should drop into notch 35 before the point 40A drops into the notch 36. Furthermore point 37A should remain in the notch 35 until the point 40A has cleared the notch 36. Thus, the notch 35 should be wider than notch 36.

If the batteries shown at 16, 17 and 18 are all charged to the desired level, as points 9, 10 and 11 close each ten minutes, the relays 13, 14 and 15 will be energized. They will operate to close the points 13A and 13B; then close points 14A and 14B; then close points 15A and 15B; all of which direct the A.C. current through the motor 3, and this will continue hour after hour. If the device reaches a cycle where the battery 16 is discharged to such an extent that it will not close the relay 13, motor 3 will stop. Then point 40 will direct the A.C. current to the point 8B and over to 13C and 13D; to 14C and 14D and then over to 15C and 15D and from there to 7B which is normally open, and also to point 19 which is a common lead. The current now being at point 19, it will cause closure to 19B. This will then heat the Amperite coil 7C constituting a thermal relay, and such relay will close, and after sufficient time, depending upon the time delay of the relay, the points 7A and 7B will close. This will cause the starting of the motor 6 as well as close the relay 5 and energize the charger 4. Since the motor 3 would then be stopped and the points 11A and 11B closed, the charging current would then be directed through the closed points 11A and 11B to the battery connected to that set of points, for example, the battery 16.

It is desirable to disconnect the coil or relay 13 while the battery is being charged for if the relay is not disconnected it would promptly close, thus breaking the circuit. It is to be noted that the relay 13 became energized simultaneously with the actuation of the charger 4 and the energization of the motor 6. Then the points 5A and 5B are separated, thus disconnecting the common circuit of the relay coils 13, 14 and 15.

When the cycle was started, and the point 19A was not positioned in the notch 20A, the current would not have been directed through points 19 and 19A directly to the motor, charger and relay 5, and there would have been no need for the thermo relay 7. Accordingly, thermo relay 7 is for the purpose of getting disk 20 in connection with point 19, "off-center" so to speak.

The relay 2 is energized at all times that A.C. current is on the line and is employed for the purpose of preventing a flow of current from the batteries to the coils 13, 14 and 15 in the event that the current becomes interrupted at a testing point. That would run down the batteries if left for a prolonged period of time.

When the disk 20 has traveled for half a revolution, namely, for fifteen minutes, point 19 and the slot 20A breaking the circuit, would cut off the charger and permit relay 5 to open and place the unit in condition for proceeding again through its testing cycle. If the testing cycle indicates that the battery is at the required charge level the designated relay 13, 14 or 15 will close, directing the current to the motor 3 so that another testing cycle will start. If the relays, or either of them, did not close because of insufficient current in the batteries, then the current would again be directed to the thermoheating element 7C to start a charging cycle after the delay as designated by the relay points has lapsed. Then the contacts 7A and 7B in the element 7 will close, beginning a new charging cycle. The thermal relay 41 has the purpose of delaying the start of the testing cycle after the charging has been performed, thus permitting the batteries just charged to reach equilibrium conditions.

Having thus described a single embodiment of the invention, it is obvious that the same is not to be restricted thereto, but is broad enough to cover all structures coming within the scope of the annexed claims.

What I claim is:

1. An apparatus for testing and charging a group of batteries comprising, means operating to test current output from the batteries in the group at spaced, predetermined intervals, a battery charger, and means controlled by the testing means for setting the charger in operation to supply charging current to either all or any one of the batteries when the charge level in all of the batteries or any one of them in the group is below a predetermined point and is indicated by the testing means.

2. An apparatus for testing and charging a group of batteries comprising, an electrically-operated testing means for testing the current output from the batteries, said means indicating battery condition at predetermined intervals, said testing means being rendered inoperative for any battery in the group at any time in its testing cycle when said particular battery to which it is connected falls below a predetermined charge level, a battery charger connected to the batteries, and means for supplying charging current to the charger to cause it to charge one or the other or all of the batteries but only when the testing means is rendered inoperative because of a low charge level in any particular battery.

3. An apparatus for testing and charging batteries as provided for in claim 2, wherein the testing means includes rotary elements for closing circuit to the battery at spaced, predetermined intervals, relays in circuit to the batteries, the charger being electrically connected to the relays and set in charging operation for any particular battery only when current from the batteries or either of them is insufficient to energize the relays.

4. An apparatus for testing and charging one or more of a group of batteries comprising, a battery charger, an electric circuit for the supply of current to the charger, battery-testing means including a plurality of rotated, notched disks and a motor for rotating the same, switch contacts normally held open but closed when engaged in the notches in the disks, said contacts being in circuit with the batteries, relays in circuit between the batteries and the charger, said relays being energized when the current flow from the batteries to the relays is above a predetermined level and said relays being effective to close circuit to the charger and cause charging of all or any one of the batteries by the charger when the current from any one of the batteries is insufficient to energize the relays.

5. A battery-testing and charging apparatus comprising, a testing device operated at spaced, predetermined intervals to direct current from any one battery of a group of batteries into a control circuit for a battery charger, a battery charger, means for supplying A.C. current thereto, an electric circuit establishing connection between the several batteries and charger, and means for causing charging operation by the charger to charge any one of the batteries without charging the others and for a predetermined cycle during which cycle the testing device is rendered inoperative on the particular battery being charged.

6. A battery testing and charging device comprising, a charger, a circuit extending from a plurality of batteries to be tested and charged to the charger, switch means interposed in the circuit between the batteries and the charger, which switch means maintains open circuit between the batteries and the charger as long as the batteries or either of them has current output above a predetermined level, said switch means being effective to close circuit between the charger and any particular low-charged one of the batteries when the batteries or any one of them have a lower current output, means for operating the charger for a predetermined period when the circuit between the charger and any one of the batteries is closed, and means controlled by the current output from the batteries for restoring open circuit between the batteries and charger at the conclusion of a predetermined charging cycle.

7. A battery testing and charging device comprising, a tester for automatically testing the current output of a plurality of batteries at predetermined intervals, a charger for charging each of the batteries for a predetermined time if the current output for any particular battery is found to be below a required charge level, means for interrupting the testing operation of the tester and starting the charging operation of the charger to direct charging current from the charger to the particular low-charged battery in the group for a predetermined charging period, and said means being effective to begin a testing cycle for said particular battery at the conclusion of the charging cycle.

8. A battery testing and charging device as provided for in claim 7, wherein the tester is connected to several banks of batteries and is effective to selectively charge and test any one of the batteries in the banks.

References Cited by the Examiner

UNITED STATES PATENTS

| 2,305,178 | 12/1942 | Lomax et al. | 320—21 X |
| 2,496,859 | 2/1950 | Dalzell | 320—19 |
| 3,062,998 | 11/1962 | Medlar | 320—33 |
| 3,176,210 | 3/1965 | Bethke | 320—40 |

FOREIGN PATENTS 599,415   3/1948   Great Britain.

JOHN F. COUCH, *Primary Examiner.*

S. WEINBERG, *Assistant Examiner.*